Figure 1:
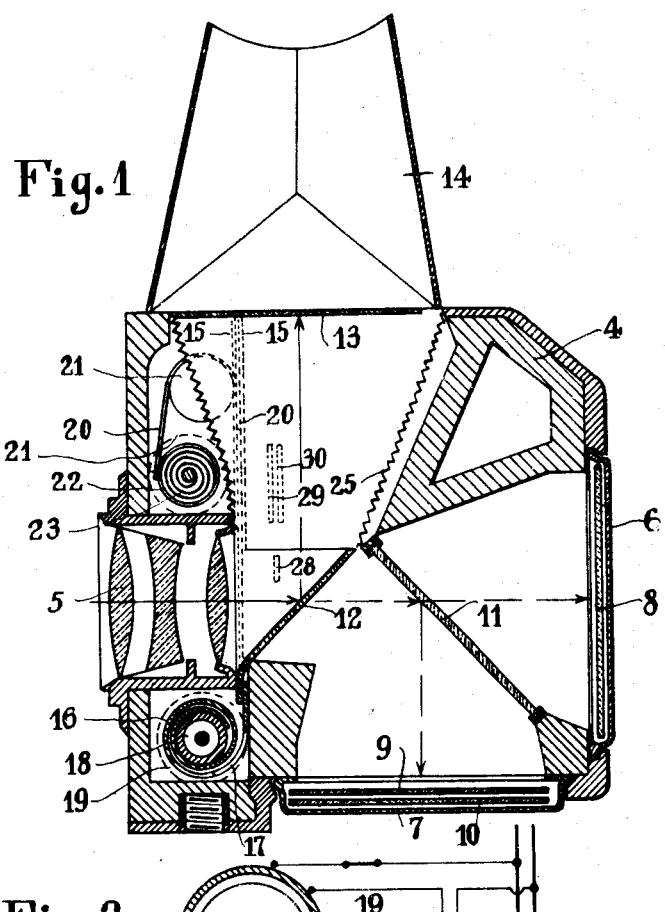

June 25, 1935.  J. ZIMMER  2,006,007
CAMERA FOR TAKING INSTANTANEOUS COLOR PHOTOGRAPHS
Filed April 12, 1933   2 Sheets-Sheet 1

Inventor:
Josef Zimmer
by S. Sokal,
attorney.

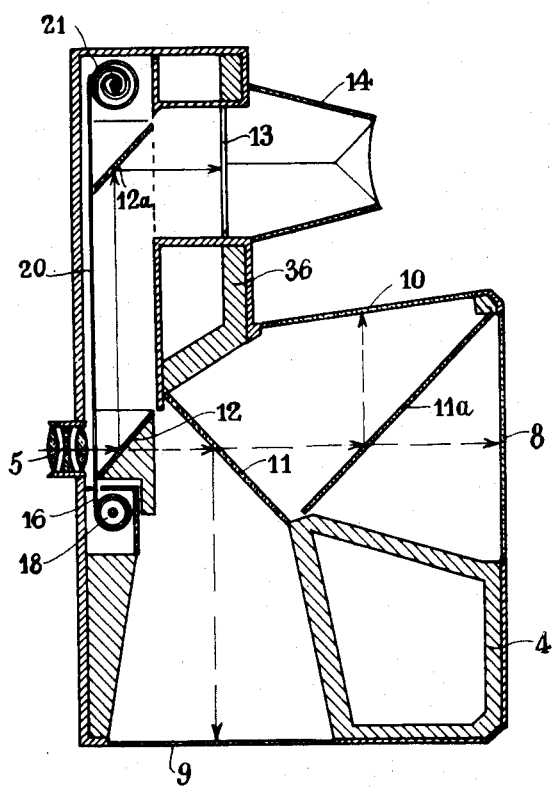

Patented June 25, 1935

2,006,007

UNITED STATES PATENT OFFICE 2,006,007

CAMERA FOR TAKING INSTANTANEOUS COLOR PHOTOGRAPHS

Josef Zimmer, Nurburg, near Ahrweiler, Germany

Application April 12, 1933, Serial No. 665,629
In Germany April 19, 1932

8 Claims. (Cl. 95—2)

The present invention relates to a camera for taking instantaneous color photographs having one or more light transmitting distributing mirrors, which distribute the light passing through the objective on to several light sensitive layers. The novel camera according to the invention is particularly intended for photographing the iris of the eye, but is of course also suitable for the purpose of taking other instantaneous color photographs.

The principal object of the invention is to provide a camera of this kind with a device for sharply focussing the object which is to be photographed. It is obvious that the focussing operation could be effected by the aid of one of the light distributing mirrors by causing the mirror to reflect a part of the incident light on to a focussing screen placed in the position of a sensitive layer. Although this method is possible, it has the great drawback that the camera is not ready for taking a photograph immediately after the focussing operation.

According to the present invention the aforesaid object is attained by providing, in addition to the light-transmitting distributing mirror or mirrors, and between these and the objective, one or more mirrors not capable of transmitting light and serving for focussing the image of the object on a focussing screen. The particular one of the last-named mirrors located nearest to the objective is connected with a cloth roller-blind of known kind containing an exposure opening and serving as a shutter and a device for adjusting the time of exposure, in such manner that upon release of the roller-blind the mirror which does not transmit light is removed from its operative position. By means of this arrangement it is rendered possible on the one hand to carry out the focussing operation when the light sensitive layers are already in position for exposure, i. e. when the dark slides containing them have already been brought into position and opened. On the other hand the release of the roller-blind and consequently the exposure of the sensitive layers can take place immediately after the focussing operation. This is important not only generally for the photographing of moving objects, but also particularly for the photographing of the iris of the eye, in view of the fact that on account of the great liability to rapid motion of the eye, the period of time between the moment when the sharpest focus is obtained and the moment of exposure of the sensitive layers must be as small as possible.

When photographing the iris of the eye the focussing operation as also the exposure is preferably carried out by artificial light, in which case a weaker source of light is employed for the focussing operation in order to avoid a detrimental effect on the eye. The two sources of light may be arranged on the camera itself. The stronger source of light for the exposure may be adapted to be automatically put in operation dependently on the movement of the roller-blind or the focussing mirror respectively by providing the movable mirror with a switch member adapted to close an electric circuit.

Figure 2:
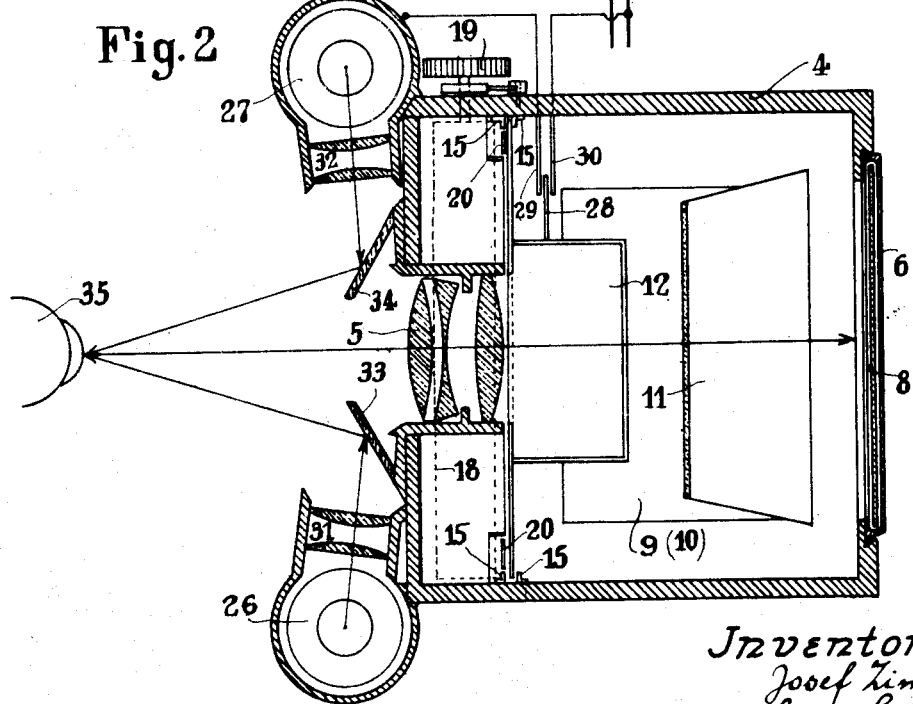

Two preferred constructional forms of a camera according to the invention are illustrated by way of example on the accompanying drawings, in which:

Fig. 1 is a vertical section through a camera according to the first constructional form, Fig. 2 is a horizontal section corresponding thereto, and Fig. 3 is a vertical section through a camera according to the second constructional form, the parts being shown entirely diagrammatically.

Referring to the drawings:

The body 4 of the camera is provided on its front wall with a powerful objective 5 of known kind, whilst in its rear wall and in its base suitable openings for the insertion of dark slides 6, 7 are provided, which contain the light sensitive layers 8, 9, 10. In the interior of the body 4 a light distributing mirror 11 consisting, for example, of a superficially silvered glass reflector is arranged at an angle to the optical axis of the objective, which distributing mirror leads the rays of light incident upon it partly towards the sensitive layers 9, 10 arranged in the dark slide 7 at the bottom, for example, to a layer sensitive to blue light and a layer sensitive to yellow-green light located behind the former, whilst the remaining part of the beam of light passes through the mirror 11 to the sensitive layer 8 arranged on the rear wall in the dark slide 6, which lastnamed layer may, for example, be sensitive to red rays. The supports of the sensitive layers 8, 9 and 10 may consist, as is customary, of thin films, glass plates or other suitable supporting means.

Between the objective 5 on the one hand and the light distributing mirror 11 on the other hand, a second mirror 12 is arranged which, in contradistinction to the distributing mirror 11, is incapable of transmitting light. The mirror 12 is arranged at an angle of 45° to the optical axis of the objective and serves the purpose of deflecting the incident light upwards on to a focussing screen 13 provided in an opening of the cover of the camera body 4 for the purpose of enabling the focussing operation to be effected. In order to be able to observe the image on the focussing screen properly a light screening member 14 which is adapted to be folded up and is of known type is arranged on the cover of the camera body. The non-light transmitting mirror 12 is mounted so as to be movable up and down in a vertical direction, for example, by means of two guide rails 15 provided on the right and left hand side of the mirror respectively. The said mirror can thus be removed upwardly out of the position for focussing shown in Figs. 1 and 2 in order to allow the beam of light passing through the objective to reach the distributing mirror 11 and the light sensitive layers 8–10 when it is desired to take the photograph. In the position shown in Figs. 1 and 2, however, the non-light transmitting mirror 12 shuts off the objective 5 from the light transmitting mirror 11 and the light sensitive layers. In order to obtain a reliable light closure an opaque bellows 25 closed all round is inserted between the focussing mirror 12 and the focussing screen 13, the said bellows being extended during the focussing operation and being closed up when the mirror 12 is removed from its working position.

The non-light transmitting mirror 12 is connected to a cloth roller-blind 16 of known kind, which is guided immediately behind the objective 5 and is provided with an exposure opening 17. The said roller-blind is wound up on a roller 18 mounted in the camera body 4 below the objective 5, the said roller 18 being adapted to be turned from the exterior in the winding-up direction, for example by means of a knob 19. From the focussing mirror 12 attached to the upper end of the roller-blind 16, two cords or bands 20 pass upwards, which are guided over guiding rollers 21 to a winding-up roller 22 which is provided with a spring serving for the rotation of the roller, the said spring being adapted to be wound up from outside, for example by means of a knob 24. The spring 23 is maintained in the tensioned condition by means of a locking member which is releasable from the exterior. After the release of the locking member the roller 22 is turned by the spring 23, whereby the bands 20 are wound up on the roller 22, with the result that the focussing mirror 12 is moved upwards out of the optical axis of the objective, and the roller-blind 16 winding off from the roller 18 is carried past the objective 5 so that its exposure opening 17 passes the objective and the exposure of the light sensitive layers takes place. The time of exposure can be regulated in known manner by adjusting the tension of the tension spring 23, by braking or the like.

As can be seen, it is possible with this arrangement to carry out the focussing operation—which can be effected either by adjustment of the objective 5, or by displacement of the whole camera or by simultaneous adjustment of the objective and displacement of the camera—after the dark slides 6 and 7 containing the light sensitive layers 8–10 have been put in place and opened, i. e. after the light sensitive layers have been made ready for the exposure. On the other hand, the release of the shutter can take place immediately after the focussing operation so that the least possible period of time elapses between the focussing operation and the exposure of the light sensitive layers.

When the camera is principally intended for photographing the iris of the eye, two artificial sources of light, for example electric lamps 26, 27, are provided, the one lamp 26 being adapted to provide the less powerful light for the focussing operation and the other lamp 27 the stronger light for the photographing operation. The lamp 27 may, if desired, also be replaced by an electrically ignited flash lamp. Whilst the focussing lamp 26, which may continue to burn during the exposure, can be switched in and out directly by hand, an automatic switch is provided for the lamp 27 supplying the light for the photographing operation, the said switch switching in and out the lamp for the time period of the exposure. For this purpose there may, for example, be provided on the focussing mirror 12 an insulated contact member 28 which co-operates with two contacts 29, 30 which are fixed on the camera body 4 and are arranged in the circuit of the lamp 27. When the focussing mirror 12 and the roller-blind 16 are moved upwards by the roller 22 rotated by the spring 23, the contact 28 passes right through between the two contacts 29, 30 connecting the latter temporarily with one another, and thus switches the lamp 27 automatically in and out again. If desired an automatic switch controlled by the focussing mirror 12 may likewise be provided for the focussing lamp 26, the said switch being adapted to close the circuit of the lamp 26 when the mirror 12 is located in the operative position. The two lamps 26, 27 are arranged at different places on the body of the camera, for example on opposite sides of the objective 5 on the front wall of the said body 4. The light from the lamps is—if necessary with the interposition of condensers 31, 32—led on to two mirrors 33, 34 arranged laterally of the objective 5 and located at an angle to the optical axis of the objective, up to the object to be photographed, namely the eye 35 indicated in Fig. 2. If desired the lamps 26, 27 may, however, also be arranged in such manner that they project their light directly forwards on to the object so that the condensers 31, 32 and mirrors 33, 34 are dispensed with.

The focussing screen 13 may be arranged vertically instead of horizontally. In this case it is arranged as shown in Fig. 3 in an opening of the back wall of an extension 36 of the camera body 4. In this case it is then, of course, necessary to provide in addition to the focussing mirror 12 located immediately behind the objective 5 a second non-light transmitting mirror 12a which reflects the upwardly projected beam of light coming from the mirror 12 to the rear on to the focussing screen 13. This second mirror 12a is stationary whilst the mirror 12 is movable in a vertical direction and is connected with the roller-blind 16 containing the exposure opening. From Fig. 3 it will likewise be seen that the arrangement is also applicable for the focussing of the object with a multi-color camera of the kind provided with two light distributing mirrors 11 and 11a arranged one behind the other. In this case the three light sensitive layers 8–10 are all arranged at different places, namely one on the bottom, one on the rear wall and one on the cover of the camera body 4. The layer 9 is illuminated by the part of the beam of light reflected from the first mirror 11, the layer 10 by the part reflected by the mirror 11a and the layer 8 by the remaining part of the beam of light.

The construction of the light distributing mirrors 11 and 11a is unimportant for the invention. The said mirrors can, as already indicated with regard to the first constructional example, all or in part consist of superficially silvered glass mirrors which, if desired, for the purpose of avoiding the parallax, are colored complementarily to the color sensitiveness of those light sensitive layers which are exposed to the parts of the beam of light reflected by them, or they may consist all or in part of film mirrors which may likewise be colored. Finally the mirrors may be arranged so that they can be flapped over in order to move them out of their operative position when, as is easily possible, uni-color photographs are to be taken with the camera by employing only one light sensitive layer arranged on the rear wall of the camera body 4. The focussing mirrors 12, 12a may also be of any known construction. They may, for example, consist of superficially silvered, but non-transparent glass mirrors, or, if desired, of metal mirrors.

I claim:

1. In a camera for taking instantaneous color photographs, more particularly photographs of the iris of the eye, of the type set forth, the combination of: a focussing screen; at least one light-reflecting, but not light-transmitting mirror, arranged behind the objective of the camera at an angle to the optical axis thereof, movable transversely to the said axis, and reflecting incoming light rays on to said focussing screen; a shutter comprising a cloth roller-blind provided with an exposure opening and connected to said mirror in such manner that said roller-blind and said mirror move together with one another; an electrically operated source of light mounted on the camera and illuminating the object to be photographed; stationary contacts on the camera connected in the circuit of said source of light; and an insulated switch member mounted on said mirror and adapted to connect said contacts during the movement of said mirror and said roller-blind to close the circuit of said source of light transitorily.

2. In a camera for taking instantaneous color photographs, more particularly photographs of the iris of the eye, of the type set forth, the combination of: a focussing screen; at least one light-reflecting, but not light-transmitting mirror, arranged behind the objective of the camera at an angle to the optical axis thereof, movable transversely to the said axis, and reflecting incoming light rays on to said focussing screen; a shutter comprising a cloth roller-blind provided with an exposure opening and connected to said mirror in such manner that said roller-blind and said mirror move together with one another; an electrically operated source of light mounted on the camera and illuminating the object to be photographed; stationary contacts on the camera connected in the circuit of said source of light; an insulated switch member mounted on said mirror and adapted to connect said contacts during the movement of said mirror and said roller-blind to close the circuit of said source of light transitorily; and a second source of artificial light of lower power than said first named one, said second source serving for providing the necessary illumination for the focussing operation.

3. A camera for taking instantaneous color photographs, more particularly photographs of the iris of the eye, of the type set forth, comprising in combination: a camera body; an objective on said camera body; a focussing screen on said camera body; at least one light-reflecting but not light-transmitting mirror, arranged behind said objective at an angle to the optical axis thereof, movable transversely to the said axis, and reflecting light rays on to said focussing screen; a shutter comprising a cloth roller-blind provided with an exposure opening and connected to said mirror in such manner that said roller-blind and said mirror move together with one another; an electrically operated source of light mounted on the camera and illuminating the object to be photographed; stationary contacts on the camera connected in the circuit of said source of light; an insulated switch member mounted on said mirror and adapted to connect said contacts during the movement of said mirror and said roller-blind to close the circuit of said source of light transitorily; and a second source of artificial light of lower power than said first named one, said second source serving for providing the necessary illumination for the focussing operation, substantially as described.

4. A camera for taking instantaneous multicolor photographs, comprising in combination: a camera body; an objective on said camera body; a focussing screen on said camera body; at least one light-transmitting distributing mirror arranged behind said objective and co-operating therewith to distribute the light passing through said objective on to a plurality of independent light sensitive layers; at least one light-reflecting, but not light-transmitting mirror arranged between said light-transmitting distributing mirror and said objective behind the latter at an angle to the optical axis thereof, rectilineally movable transversely to the said axis, and reflecting incoming light rays on to said focussing screen; a shutter comprising a cloth roller blind provided with an exposure opening and having one end attached to said light-reflecting, but not light-transmitting mirror; pull members likewise attached to said last named mirror; a pull and wind-up roller connected to said pull members; and a wind-up spring associated with said roller.

5. In a camera for taking instantaneous multicolor photographs, more particularly photographs of the iris of the eye, of the type set forth, the combination of: a camera body; means for arranging on said body at least two sensitive layers at an angle to one another; an objective on said camera body; at least one light-transmitting distributing mirror arranged behind said objective at an angle to the optical axis thereof and co-operating therewith to distribute the light passing through said objective, when an exposure is made, on to the sensitive layers; a focussing screen on said camera body; at least one movable light-reflecting, but not light-transmitting mirror arranged between said light-transmitting distributing mirror and said objective at an angle to the optical axis thereof, said movable mirror being arranged in said camera body in such manner that when it is in its operative position it screens off said distributing member from the objective and throws the incoming light on to said focussing screen; a shutter associated with said objective; and means for moving said light-reflecting, but not light-transmitting mirror in dependence on the movement of said shutter.

6. In a camera for taking instantaneous multicolor photographs, more particularly photographs of the iris of the eye, of the type set forth, the combination of: a camera body; means for arranging on said body at least two sensitive layers at an angle to one another; an objective on said camera body; at least one light-transmitting distributing mirror arranged behind said objective at an angle to the optical axis thereof and co-operating therewith to distribute the light passing through said objective, when an exposure is made, on to the sensitive layers; a focussing screen on said camera body; at least one light-reflecting, but not light-transmitting mirror arranged between said light-transmitting distributing mirror and said objective at an angle to the optical axis thereof, said mirror being slidably displaceable rectilineally in a direction transverse to the optical axis of the objective and being arranged in said camera body in such manner that when it is in its operative position it screens off said distributing member from the objective and throws the incoming light on to said focussing screen; a shutter associated with said objective; and means for moving said light-reflecting, but not light-transmitting mirror in dependence on the movement of said shutter.

7. In a camera for taking instantaneous multi-color photographs, more particularly photographs of the iris of the eye, of the type set forth, the combination of: a camera body; means for arranging on said body at least two sensitive layers at an angle to one another; an objective on said camera body; at least one light-transmitting distributing mirror arranged behind said objective at an angle to the optical axis thereof and co-operating therewith to distribute the light passing through said objective, when an exposure is made, on to the sensitive layers; a focussing screen on said camera body; at least one movable light-reflecting, but not light-transmitting mirror arranged between said light-transmitting distributing mirror and said objective at an angle to the optical axis thereof, said movable mirror being arranged in said camera body in such manner that when it is in its operative position it screens off said distributing member from the objective and throws the incoming light on to said focussing screen; a shutter associated with said objective, said shutter comprising a cloth-roller-blind provided with an exposure opening and connected to said movable mirror; and means for moving said light-reflecting, but not light-transmitting mirror transversely to the direction of the optical axis of said objective in dependence on the movement of said shutter.

8. In a camera for taking instantaneous multi-color photographs, more particularly photographs of the iris of the eye, of the type set forth, the combination of: a camera body; means for arranging on said body at least two sensitive layers at an angle to one another; an objective on said camera body; at least one light-transmitting distributing mirror arranged behind said objective at an angle to the optical axis thereof and co-operating therewith to distribute the light passing through said objective, when an exposure is made, on to the sensitive layers; a focussing screen on said camera body, said focussing screen having an operative field of precisely the same dimensions as those of each of the operative fields of the sensitive layers; at least one movable light-reflecting, but not light-transmitting mirror arranged between said light-transmitting distributing mirror and said objective at an angle to the optical axis thereof, said movable mirror being arranged in said camera body in such manner that when it is in its operative position it screens off said distributing member from the objective and throws the incoming light on to said focussing screen; a shutter associated with said objective; and means for moving said light-reflecting, but not light-transmitting mirror in dependence on the movement of said shutter.

JOSEF ZIMMER.